(12) United States Patent
Sieling (10) Patent No.: US 10,959,369 B2
(45) Date of Patent: Mar. 30, 2021

(54) OPENERS FOR SEEDERS

(71) Applicant: ROTACON ENGINEERING LIMITED, Onerahi (NZ)

(72) Inventor: Nicolaas Laurisse Sieling, Onerahi (NZ)

(73) Assignee: ROTACON ENGINEERING LIMITED, Onerahi (NZ)

(*) Notice: Subject to any disclaimer, the term of this patent is extended or adjusted under 35 U.S.C. 154(b) by 128 days.

(21) Appl. No.: 15/513,430

(22) PCT Filed: Sep. 17, 2015

(86) PCT No.: PCT/NZ2015/050155
§ 371 (c)(1),
(2) Date: Mar. 22, 2017

(87) PCT Pub. No.: WO2016/048167
PCT Pub. Date: Mar. 31, 2016

(65) Prior Publication Data
US 2017/0238457 A1    Aug. 24, 2017

(30) Foreign Application Priority Data
Sep. 22, 2014    (NZ) .................................... 700271

(51) Int. Cl.
*A01C 7/20*     (2006.01)
*A01C 5/06*     (2006.01)
*A01B 61/04*    (2006.01)

(52) U.S. Cl.
CPC ............ *A01C 7/205* (2013.01); *A01B 61/046* (2013.01); *A01C 5/062* (2013.01); *A01C 5/064* (2013.01); *A01C 5/068* (2013.01); *A01C 7/203* (2013.01)

(58) Field of Classification Search
CPC ......... A01C 7/201; A01C 7/203; A01C 7/205; A01C 5/062; A01C 5/064; A01C 5/068;
(Continued)

(56) References Cited

U.S. PATENT DOCUMENTS 4,311,104 A    1/1982   Steilen et al.
5,351,635 A   10/1994   Hulicsko
(Continued)

FOREIGN PATENT DOCUMENTS

AU     2010201330    3/2011
GB       2091073    7/1982

OTHER PUBLICATIONS

International Search Report, PCT/NZ2015/050155, dated Jan. 15, 2016.

*Primary Examiner* — Alicia Torres
(74) *Attorney, Agent, or Firm* — Nixon & Vanderhye (57) ABSTRACT

Openers for a seeder, configured to be adjustably engaged with a soil surface when in use; each opener having compliance to vertical and lateral excessive forces independently applied to soil-engaging parts: a fertiliser tine, a seed tine, a press wheel, a coulter, and a support wheel. The openers share a hydraulic circuit, linked to each internal frame-lifting ram so that localised rise and fall effects arising from soil surface irregularities are shared, maintaining a mean height. The seed tine of each opener is mechanically coupled to the preceding fertilizer tine and is lifted when the fertilizer tine is displaced. The openers do not require external weight support.

13 Claims, 3 Drawing Sheets

(58) Field of Classification Search
CPC ..... A01B 15/20; A01B 21/086; A01B 33/087; A01B 61/044; A01B 61/046; A01B 61/048
See application file for complete search history.

(56) References Cited

U.S. PATENT DOCUMENTS

| | | | | |
|---|---|---|---|---|
| 5,868,207 | A | * | 2/1999 | Langbakk ............... A01C 7/201 172/274 |
| 6,827,029 | B1 | * | 12/2004 | Wendte ................... A01C 7/042 111/185 |
| 8,286,566 | B2 | * | 10/2012 | Schilling ................ A01C 7/205 111/163 |
| 2004/0211346 | A1 | | 10/2004 | Beaujot et al. |
| 2010/0270043 | A1 | | 10/2010 | Ankenman |
| 2011/0315410 | A1 | | 12/2011 | Kinzenbaw |
| 2012/0060730 | A1 | | 3/2012 | Bassett |
| 2013/0118391 | A1 | * | 5/2013 | Gadzella ................ A01C 7/205 111/163 |

\* cited by examiner

OPENERS FOR SEEDERS

FIELD

This invention relates to agricultural machinery for sowing crops; and more particularly to aspects of seeders carried upon the machinery for implanting seeds and optionally also fertilizer in soil.

Definitions

Seeder—an agricultural machine that deposit seed and (usually also) fertilizer into soil in the same operation. This type uses air currents in pipes used to distribute seeds and fertilizers around the machine from hoppers. The example under consideration has 40 individual seeder units or openers arrayed across a direction of travel in two banks, across about 12 metres width.

Openers are individual units within a seeder; replicated across the width of the seeder.

Knives cut into the soil like ovipositors, making a trench.

A coulter is a blade or sharp-edged disc attached to a seeder so that it cuts through the soil vertically in advance of the of the knives or discs The term actuator as used herein refers to a powered ram, usually a hydraulically driven ram and sometimes a reversible ram having connections at one or both ends to a controlling supply of hydraulic fluid under pressure. Pneumatic or electrically driven rams or winches are options.

A lowered working configuration means a configuration in which the agricultural machinery is applied to the soil surface and can perform its allotted task, such as (but without limitation) sowing seeds upon or within a soil surface.

A raised working configuration is when the machine is still spread across its path but has been raised above the soil in an uplifted or disengaged mode.

A transport configuration means a configuration in which the agricultural machinery is able to fit through farm gates (3-5 metres wide) and will comply with public road transport regulations in relation to width and height upon a public road, so that the equipment can be taken from one site to another without escort.

We refer to the provision for "restorable sideways movement" as "sideways compliance".

CROSS-REFERENCES

The Applicant has concurrent patent applications having a common priority date, locatable by inventor name SIELING, Nicolaas Laurisse; U.S. Ser. No. 15/513,302 and U.S. Ser. No. 15/513,289 in relation to openers installed in or for seeders.

BACKGROUND AND PROBLEM TO BE SOLVED

In large-scale crop farming it is desirable to sow seeds and fertilizer in an optimised way, in order to maximise crop yields. Seeders may cover a very wide swathe in each pass for large-scale cropping. Multiple (perhaps 40) individual openers held in a chassis towed behind a powerful tractor actually apply the seed and fertilizer in a controlled way. Precise satellite-based navigational control often augmented by use of a local reference transmitter automatically provides accurate placement of every row. Considerable design effort has been applied to seeder development over the years, in order to optimise the accuracy and reproducibility of the seed and fertilizer placement. Optimisation may significantly raise returns with little extra cost.

In the following six aspects the inventor has listed a set of inter-related aspects of seeders. An operational seeder may benefit from solutions to some or all of these aspects.

Aspect #1:

Most openers use an actuator (usually a hydraulic ram with controlled pressure or a tensioned compression spring) to control the force required for the knives (also called tines) to deviate from their desired operating position upon striking an obstacle. Many openers incorporate a parallelogram assembly having a vertical motion, together with the ram, to ensure the knives maintain an almost constant angle to the ground regardless of the operating (cutting) depth chosen. The inventor has noted that the sideways forces applied to this parallelogram when the knives strike and glance off an obstacle or the whole machine is driven through a turn are very large and the framework of the parallelogram often bends, fractures or fails. That is, prior art machines don't have sideways compliance.

Aspect #2

Seeders have a number of different arrangements to hold the body of the machine frame off the ground while their openers with their associated coulters, knives/tines and press wheels are in contact with the ground. Most have wheels spaced at intervals on the frame of the machine, and support the weight of the seeders from the frame. Some have the knives/tines/press wheels (effectively their opener) mounted to the frame, while others design the openers to be individually able to follow the surface contours of the field using either a flanged coulter, or the press wheel to control fertilizer knife depth and seed depth. Flanged coulters require tungsten-hardened scrapers to keep dirt from them and wear on the coulter edges changes depth (of the knives and closers) and cannot be adjusted for, while use of the press wheel results in great, and undesirable variations of compaction around the seeds. All the prior art has problems when dealing with significant variations in ground contours.

The seed tine and closer interrelationship is vital to the accurate placement of the seed in terms of depth, distance from the fertilizer and soil coverage. Available combinations have some or all of the following problems:

a) Limited resistance to wear (see Aspect #5)
b) Some types use the bottom of a tube delivering the seed as the closer.
c) Tubes will need frequent replacement on account of wear.
d) Some have the closer fixed to the fertilizer tine. This leads to inefficient seed placement every time the fertilizer tine moves up and over an obstacle and increases the chance that the seed tine/closer will come down on top of the obstacle bearing all the weight of the opener on itself.

Some systems place the seed in a trench to the side of the fertilizer trench to reduce the chance of seed/fertilizer direct contact.

The present application provides means to overcome the above problems

Aspect #3

Typical seeders carry multiple openers. Each of the often forty or more openers requires adjustments to optimise its individual performance. In the case of an air seeder these include the depth of the coulter, the height of the tines, the force of the press wheel, break-out force and tine/knife/closer angles and depths. Adjusting each of these parameters in forty or more openers can be difficult and time consuming to the point that compromises may be made by the operator and the optimum result is not achieved. The opener to be described allows all of these parameters to be readily adjusted; many without tools.

Aspect #4

Simple and convenient conversion of the agricultural machine from a standard air seeder applying fertilizer and seed using knives (tines) to a disc seeder applying fertilizer (and sometimes fertilizer and seed) in a furrow made by a cutting disc or discs, is desirable.

Aspect #5 e) Many closer plates do a poor job of completely closing the trench made by the deeper fertilizer knife, resulting in some seed ending up too low in the soil and too close to the fertilizer.

OBJECT

An object of the present application is to provide improvements to agricultural machinery, especially crop sowing machinery and seeders in order to provide better optimization of planting and to improve seeder reliability, or at least to provide the public with a useful choice.

SUMMARY OF INVENTION

In a first broad aspect the invention provides a seeder for placing seeds and optionally fertilizer into a soil surface including a plurality of openers in at least one array attached to at least one rigid chassis mounted upon an agricultural machine in an orientation transversely across a direction of motion; each opener including functional parts selected from a range including a fertilizer tine and knife; a seed tine; a closer plate, a coulter wheel; a press wheel and a support wheel wherein each opener (FIG. 1, FIG. 2) is provided with mounting means for those functional parts; and each opener derives support solely from those parts when in use; the mounting means including means to give way under excessive applied forces and to provide resilient restoring forces, when in use providing each part engaging with the soil surface with a freedom to be temporarily deflected by excessive vertical and lateral forces, thereby reducing adverse effects of said excessive forces. by being vertically and laterally compliant; and a vertical mounting means for the opener includes an articulated parallelogram (112, 36, 5, 2) mounted on the plate (112) and bridged by a hydraulic ram (11) capable by a length change of raising or lowering the frame according to a contained volume of hydraulic fluid sufficient to maintain an operating height.

In a first related aspect, each opener has a resiliently mounted rigid frame (5) having sideways compliance; the frame being supported on a parallelogram suspension (112, 7, 5, 2) provided with joints permitting sideways deflection; the frame receiving sideways restoration forces from a compression spring (12) forcing an arm comprised of plates (2),(2) of the parallelogram (1) backward against a pin mounted through the frame and through slotted holes (6) within the plates; the sideways compliance being exhibited as a breakout force if the sideways forces exceed a predetermined threshold.

Preferably the or each frame (5) is subject to further sideways restoration means, comprising restoring forces developed by pressure from the ram (11) connected diagonally across the parallelogram (1) tending to force a leading edge of sides of a set of slotted holes (6) within an arm of the parallelogram (1) comprised of long plates (2),(2) backwards against a pin passed through the holes and the plate (112) of the agricultural machine, wherein excessive sideways force separates the pin from the side of one slotted hole.

Preferably the effect of the ram in restoring the frame is typically greater than the effect of the spring.

In a related aspect, a torsion tube (4) is placed parallel to and in between the plates (2); each end of the torsion tube being welded to one of two spacers (3) that maintain separation between the plates (2), thereby adding stiffness to the plates.

Preferably the system of hydraulically linked rams (11) each pivotally connected diagonally across a corresponding parallelogram (1) exhibits, when in use, a non-linear pressure/extension function in which an approach by the plate (112) to the ground requires an ever-increasing pressure to be maintained in pipes (11A), thereby providing that the entire array of openers sharing interlinked hydraulic piping (11A) tends to maintain a stable average height about the soil surface.

Preferably each ram (11) is mounted diagonally across the corresponding parallelogram (1) having an effect that as more oil is fed into the system and therefore raising the frame, the angle between ram (11) and its parallelogram (1) becomes more acute because the ram moves more in line with the parallelogram. As a result, the ram needs more hydraulic pressure to carry the weight of the frame. That non-linear relationship keeps the machine stable and maintains the same average height of the frame (5) above the soil surface on both the right side and the left side of the seeder. It has a height averaging control, and a self-balancing effect.

Preferably a fertilizer tine (85) is provided with a support including a horizontally aligned stop (10) and preferably a force applied by the hydraulic ram (11) maintains the fertilizer tine in place against the stop unless the tine is subject to a transient force.

Preferably a support wheel (15) is maintained below the frame (5) and is provided with a resilient suspension capable of independently restoring the support wheel to a normal direction in relation to the chassis (32) and the frame (122) if a transient force causes a sideways movement of the support wheel.

Preferably a coulter wheel (22) is maintained below the frame (5) and is provided with an independent resilient suspension capable of restoring the coulter wheel to a normal direction in relation to the chassis (32) and the frame (122) if a transient force causes a sideways movement of the coulter wheel.

Preferably a press wheel (14) is attached to the second parallelogram assembly (80) by an independent resilient mount, resilient in a sideways direction, including a compression spring providing a restoring force into a normal direction with reference to the second parallelogram assembly (80).

Preferably the press wheel (14) is provided with an adjustable scraper assembly (60, 61), with hard surface (62) which can be moved closer to the tyre (because of wear of the tyre or the tungsten wear strip) simply by bending rod (60).

In a second broad aspect, the ram (11) within each opener is plumbed to at least one other hydraulic ram within at least one adjacent opener; using a shared pipeline (11A), said rams and pipeline sharing a fixed volume of hydraulic fluid under a common pressure; thereby providing intercommunication means in order that instantaneous conditions affecting any one opener are communicated to one or more adjacent openers.

Preferably all the rams (11) in openers in at least one bank on each side of the seeder are plumbed together by shared pipeline (11A) as a set and share a common volume of hydraulic fluid, so that when in use a compressive force applied to any one ram (11) will cause a flow of fluid from that ram to the other rams of that set, thereby providing the array of openers with a capability to be lifted or lowered as a set in accordance with vertical forces experienced by any one opener in the array.

Optionally at least some of the rams (11) in a set of openers within a leading bank of openers on a side of the seeder are plumbed to a set of openers in the trailing bank thereby providing the array of openers with a capability to respond in anticipation of undulations on the soil surface thereby tending to maintain a predetermined depth of implantation of seeds and fertilizers.

Preferably the pipe (11A) is sealed off by operation of a valve after the rams 11 chambers are filled with a volume of hydraulic fluid sufficient to set an operating height of the frames; the parallel configuration through pipe (11A) having the effect, whenever any one tine makes contact with a hard object sufficient to cause it to move backwards and or upwards and causes the first hydraulic ram to expel hydraulic fluid into the parallel configuration, thereby causing all other rams (11) to extend slightly and thereby raising the frame (5) reducing the weight borne by the affected opener.

Preferably the shared pipeline (11A) includes a pressure control means (11T) capable when in use of releasing excessive pressure.

In a second related aspect, a second parallelogram assembly (80) provides a vertically oriented support to an assembly comprising a seed tine (91), a closing plate (96), and a press wheel (14) includes a coupling (45) capable when raised of lifting the seed tine assembly to the pivot point (9) above the fertilizer tine by a flexible yet inextensible chain (9A), so that a forward movement of the pivot point (9) in relation to frame (5) caused by the fertilizer knife striking an obstacle will be communicated through the chain to the second parallelogram assembly (80) thereby causing the seed tine to be pulled up whenever the fertilizer tine is deflected upward, thereby providing anticipation of an obstacle by the seed tine.

Preferably a breakout force for pulling up the seed tine (91) through tension in chain (9A) is predetermined by varying an amount of slack in the chain.

Preferably assembly (80) is resiliently mounted in a vertical direction by an adjustable spring (42), which also sets the press wheel pressure.

In a further related aspect, the parallelogram assembly (80) forces the upper end of the hollow seed tine to be placed further forward than the lower end, thereby providing a sloping angle for the seed tine.

In a yet further related aspect, the second parallelogram assembly (80) includes a closer plate (94) mounted in advance of the seeder tine (91), wherein the closer plate bears an array of tiles (96) of a hard material attached to a leading face of the closer plate; the hard material being selected from a range including tungsten, tungsten alloys, tungsten carbide, and chromium alloys.

Preferably each opener includes means to adjust operating parameters, including the relative heights above the soil surface of at least some of the parts engaging with the soil surface; said parameters may be adjusted before use with means selected from a range including:
placement of an end of ram (11) within one of a range of selected pivot points within plate (112), setting an amount of extension of a beam (30) maintaining the frame (5) above the support wheel (15) by selecting a hole through which a pivot pin is passed, setting extension of a beam (35) maintaining the frame (5) above the coulter wheel (22) by selecting a hole through which a pin is passed, setting an angle of attack of the fertilizer tine (85) by adjusting turnbuckle (36) and hence a tilt in frame (5), or by moving the stop (10) to a different hole or choosing a different hole for the pivot point (8).

Preferably, the relative height of the frames above the soil surface are adjustable during use by changing a loading amount of hydraulic fluid within the or each set of interlinked rams (11).

Preferably the adjustments including the depth of the coulter, the height of the tines, the force of the press wheel, the break-out force, fertilizer tine angle (by moving the pin at stop (10)), and knife and closer angles and depths can be made without use of tools.

In a further aspect, the invention provides a seeder for an agricultural machine wherein conversion to a disc seeder is accomplished at each opener by taking off the fertilizer knife (86) from the fertilizer plate (85), drawing the fertilizer tine (86) backwards to a held back position behind a pin inserted at point (87) on assembly (5), and (b) mounting an agricultural disc on the end of the fertilizer plate (85).

PREFERRED EMBODIMENTS

The description of the invention to be provided herein is given purely by way of example and is not to be taken in any way as limiting the scope or extent of the invention. In particular the dimensions shown in one illustration are purely illustrative. The invention has been described in an illustrative manner, and it is to be understood that the terminology which has been used is intended to be in the nature of words of description rather than of limitation.

Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps. Each document, reference, patent application or patent cited in this text is expressly incorporated herein in their entirety by reference. Reference to cited material or information cited in the text should not be understood as a concession that the material or information was part of the common general knowledge or was known in New Zealand or in any other country.

In this specification, reference numerals, including reference numerals appearing in the Summary of Invention, are provided for clarification only and are not intended to restrict the scope of the invention to the particular embodiments of the components in conjunction with which the reference numerals are used.

At the time of filing, optimised values for a number of quantitative aspects of the invention have not been established; in particular the amounts of sideways and vertical forces acting on wheels or tines of any one opener to firstly cause displacement from a normal position, and secondly forces causing restoration of the normal position.

DRAWINGS

FIG. 6 as 6a (the mount for the press wheel), 6b (the closing plate), and 6c (the spring that provides sideways compliance for the press wheel.

Related to appreciation of the text and drawings is a Youtube video which shows the prototype agricultural machine "Rotacon RA40" in both the working and in the transport configurations as described in co-pending applications. See https://www.youtube.com/watch?v=FBPbtyuxy_4 which was downloaded on Oct. 9, 2015. Sections of the video illustrate aspects of this application.

INTRODUCTION

This invention focuses on within-unit and between-unit relationships for openers within a seeder. It assumes use of an agricultural machine to be towed over a field carrying frames supporting items of agricultural equipment; in particular openers comprising parts of an air seeder.

It provides a suspension within a frame that provides support for the wheels and all other ground-engaging means (such as tines, openers, closers), allowing horizontal or vertical deflections, or both to occur in event of an obstacle on or in the soil, or undulation. In addition, openers are inter-coupled according to the invention, so that some events affecting one opener are transmitted to other openers. Further, some actions are coupled within any one opener so that for example a collision of a preceding fertilizer tine with a buried rock causes the following seed tine to lift before the seed tine reaches the obstacle. The invention also provides for easier adjustment of opener parameters.

Figure 1:
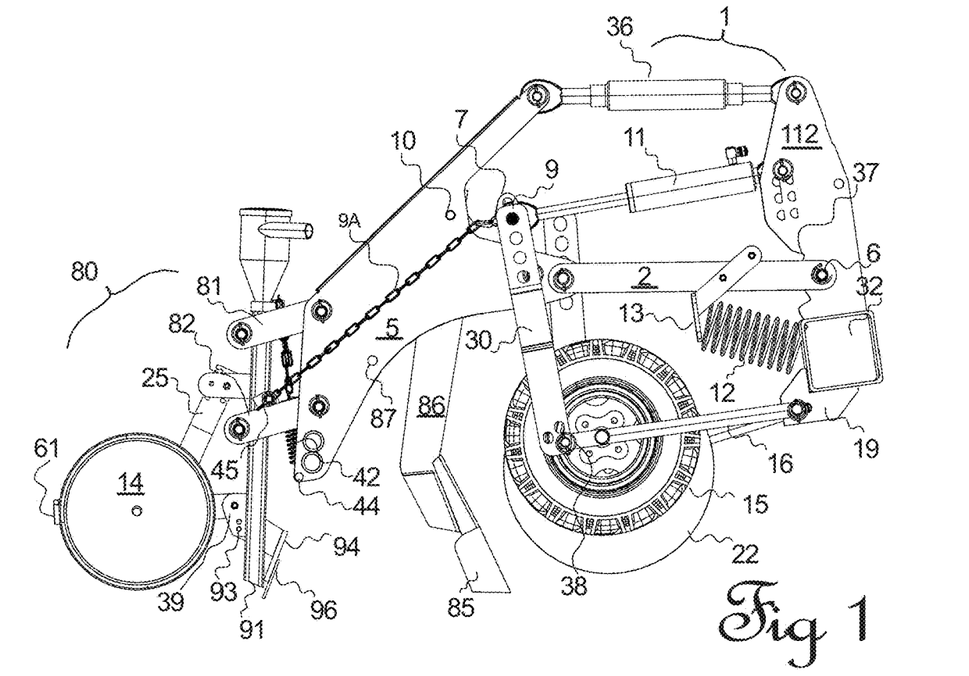
FIG. 1. Diagram showing an orthogonal right side view of an opener, lifted out of the soil.
Figure 2:
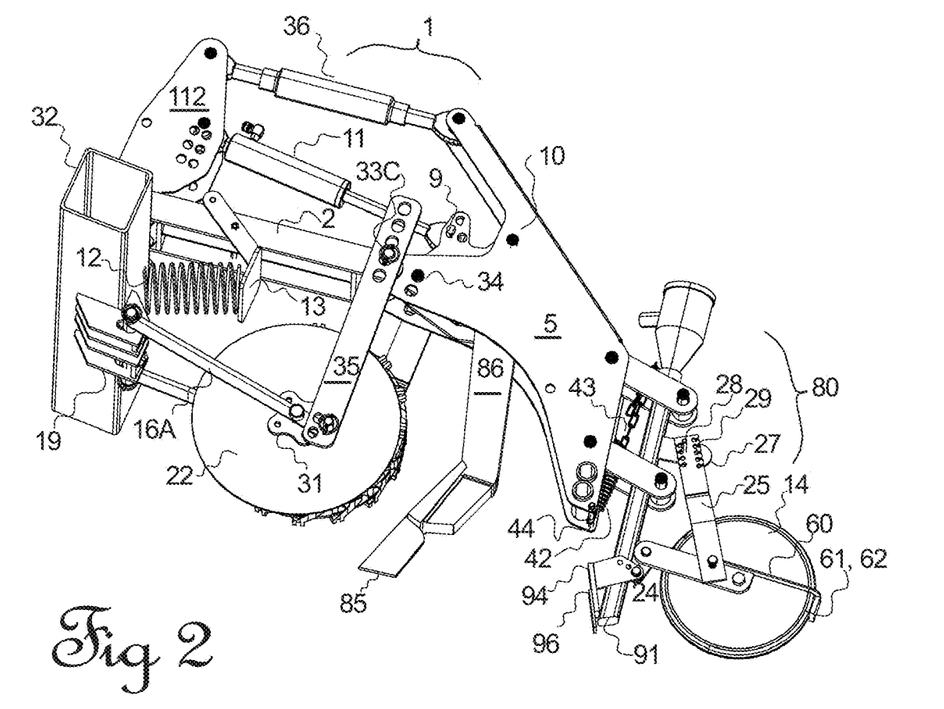
FIG. 2. Diagram showing an oblique, partly from below, left side view of the opener, also when lifted out of the soil.

For orientation, the reader is referred to FIGS. 1 and 2, showing a single opener, not in soil contact, from both sides. The leading part is at the right of FIG. 1. FIG. 2 is a partially oblique view from below, with the leading end at the left. The opener (which is one of perhaps 40 mounted on typical air-seeder agricultural machinery is towed from a chassis (32) with the press wheel (14) trailing. Rolling support wheel (15) provides weight support. The height of the frame (5) above the soil is set by selecting a hole along beam (30) for the pin that also serves as pivot (9) (see below). The cutting coulter wheel (22) is also supported at a settable height using a pin through a hole in beam (35). Fertilizer knife (85) is towed through the soil, while inserting fertilizer material. The seed tine assembly (91) trails behind and inserts seeds. The following press wheel (14) seals the slot.

Aspect #1:

Compliance. This aspect renders susceptible ground-contacting parts—especially the fertilizer knife (85), the seed tine (91), the coulter wheel (22), the support wheel (15) and the press wheel (14) of each opener of the typically 40 openers in one seeder—relatively tolerant of collision with an obstacle that may exist on or in the soil, such as a stone, or of tractor course changes. Sideways compliance in particular is provided. Apart from collisions with objects including buried rocks, tolerance to effects of swerves by the tractor is also provided, so that the seeder can proceed precisely along or close to a predetermined track.

If any of these parts were to be simply hauled along while fixed onto a mass having inertia without including any resilience in the fixing, an increased chance of breakage, and increased wear are expected. The parts of the opener are provided with a spring-loaded bias to set them normally straight ahead, yet to allow for sideways forces otherwise likely to damage the opener. A "breakout force" has to be overcome before sideways motion occurs.

Each opener has two articulated structures each articulated to move in a parallelogram configuration. The leading parallelogram (1) is comprised of plate (112) at the forward or leading edge, top adjustable arm (36), bottom arm comprised of a pair of long plates (2), and trailing frame or assembly (5). Ram (11) traverses parallelogram (1) diagonally—see later. Frame (5) is (in cross-section) a deep U-shaped shape with the closed edge along the upper left of FIG. 1. The trailing parallelogram (80) that supports the seed tine (91) and press wheel (14) comprises frame (5) at the leading edge, top arm (81), bottom arm (82), and trailing shaft (91) which as shown is a box-section tube serving as the seed tine. The press wheel is mounted off the seed tine by brackets (24) and (25), from which the press wheel is mounted at a settable height with holes (29).

Figure 4:
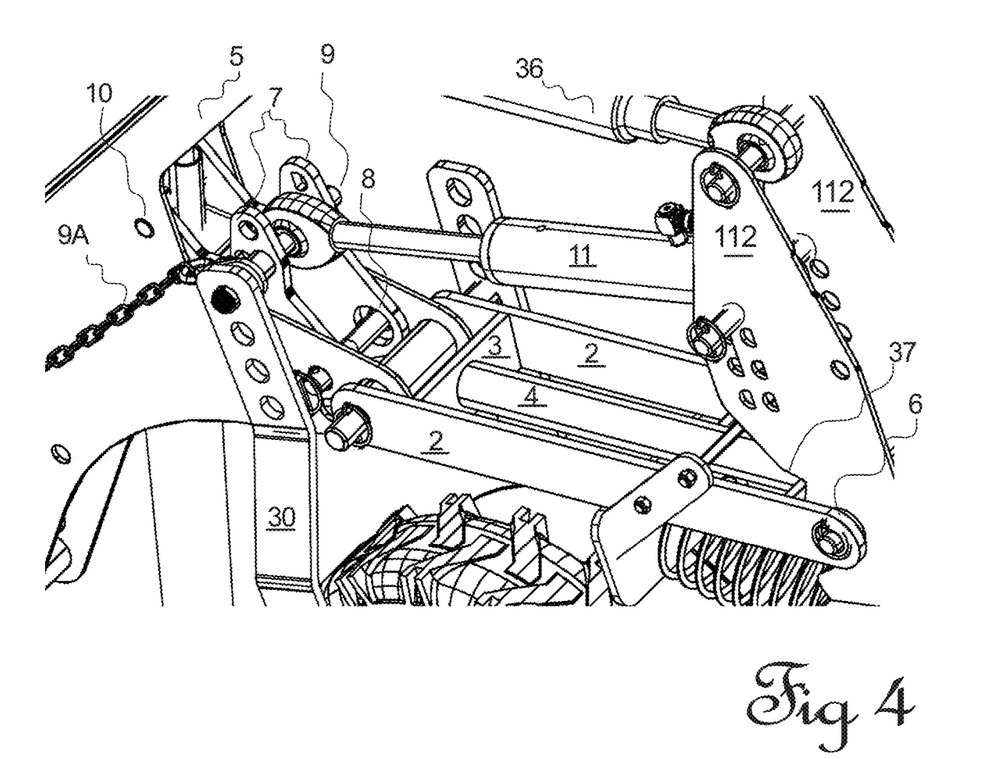
FIG. 4. Diagram showing a top elevation of the main parallelogram with the torsion tube.

The lower arm of the parallelogram assembly (1) is shown in oblique view in FIG. 4. This arm consists of two adjacent long plates (2) orientated in a vertical plane with holes at both ends serving as pivot points. Provision is made for sideways deflection of the long plates (2) relative to plate (112), in case the entire frame (5) is deflected sideways. A restoring force is provided by spring (12) pressing on plate (13) fixed along the lower arm, and by the ram (11)—see below. Spacers (3) that hold the long plates (2, 2) apart are fixed between the two long plates, ensuring that the long plates remain spaced apart by preferably about 150 cm. A torsion tube (4) lies parallel to and in between the long plates (2, 2); each end of the torsion tube being welded to one of the spacers (3).

The top arm (36), has an adjustable length and includes a turnbuckle mechanism. Each end incorporates a ball joint which allows arm (36) to move with any small movement of the opener at right angles to the direction of travel on striking an obstacle, in case the entire frame (5) is deflected sideways. The parallelogram (1) can move up and down in a conventional action, although that movement is modulated by ram (11). Absent any compliance, an obstacle colliding with fertilizer knife (85) or other parts would be likely to damage the opener.

The forward end of the lower arm (long plates 2,2) is attached to the plate (112) by a pivot pin (34) through a slotted hole (6) made in each long plate (2,2). The hole is elongated along the length of the plate, to provide for sideways compliance.

After an opener has been forced sideways by striking an obstacle, it is returned to its original alignment by the ram (11) pushing the pivot pin (9), which is connected to the rear mounting for the long plates (2),(2) of the parallelogram (1) forcing those plates backward against a pin mounted through the frame and through slotted holes (6) within the plates.

Also, a force is maintained by the strong compression spring (12) pushing against plate (13) attached to the long plates (2, 2) of the parallelogram (1) forcing those plates backward against a pin mounted through the frame and passing through slotted holes (6) within the plates. The spring (12) has two more functions: it serves to hold the opener firmly when the seeder is being carried in the transport configuration, and it holds the opener up in the raised position when the seeder is in a working but lifted configuration during headland turns for extra clearance. Note that the hydraulic ram (11) when powered in an extension mode exerts a much greater force than the spring (12) and provides most of the force for both holding the array of openers in position and for bringing them back to the normal position after being deviated sideways for example by striking an obstacle or after completing a turn.

As a result the parts of each opener are able, if subject to a "breakout force" to move from side to side to a limited extent about parallelogram (1) to avoid damage arising from obstacles but are always biased so that they will return to the designed position.

The adjustable top arm (36) of the opener allows the operator to vary the angle that the rigid frame (5) makes with respect to a horizontal plane, in order to keep the seed tine parallelogram (80) close to horizontal if large changes are made to the sowing depth, while maintaining the same press wheel (14) pressure. If the seed tine parallelogram (80) angle is lowered, then a greater component of the horizontal dragging forces experienced by the seed tine (91) and the press wheel (14) when being pulled through the soil are transferred to upward forces, reducing the press wheel pressure while a "raised" parallelogram (80) would tend to increase press wheel pressure as the seed tine is pulled through the soil. The seed tine (91) and the press wheel (14) are held at the desired angle by the seed tine parallelogram (80). Adjustment of sowing depth is discussed later in this specification under ASPECT #3.

Pivot (9) is attached to a pair of plates (7) to which the fertilizer tine (86) and knife (85) are fixed and comprises the fertilizer tine and knife assembly. The plates (7) are themselves pivotally mounted on rigid frame (5) at a pivot point (8) that is shown in FIG. 4, placed below pivot (9). A stop (10) traversing assembly (5) and trailing pivot (9) serve to limit forward movement of the fertilizer knife in its operating position that would otherwise be caused by extension of ram (11), which is provided with hydraulic pressure at pivot pin (9) in order to maintain a force on the plates (7) and fertilizer tine against stop (10). Should the fertilizer knife (85) strike an obstacle then an excessive backward force on the fertilizer tine (86) forces plates (7) to rotate away from the stop and drive the piston into the ram (11), forcing hydraulic fluid back into the hydraulic system (see below). The knife is able to be rotated in an arc around its pivot (8), lifting it backward and upwards over the obstacle.

Figure 5:
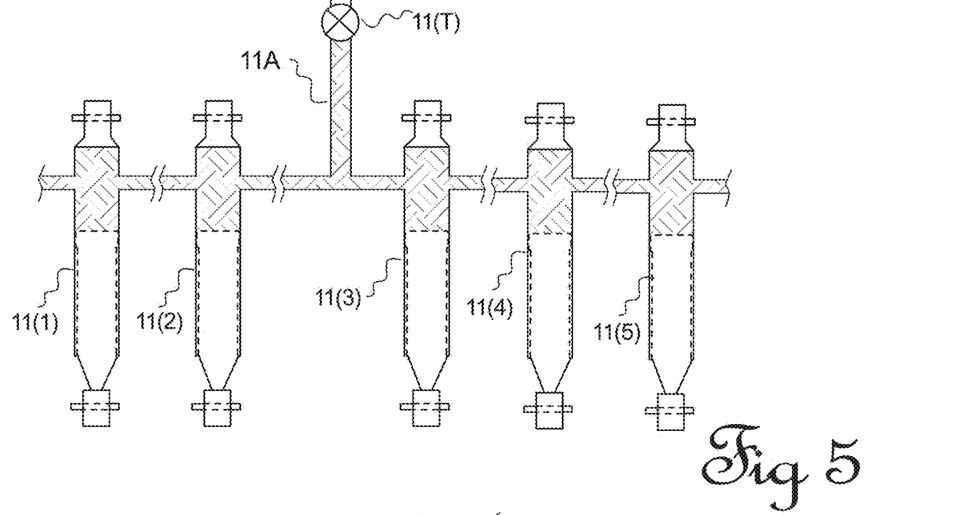
FIG. 5. Schematic diagram of the shared hydraulic plumbing for rams 11.

FIG. 5 is a schematic diagram of plumbing for a mutually co-operative suspension in which a set of identical rams (11(1)), (11(2)) within part of or an entire array of openers mounted upon a seeder are interconnected or plumbed in a parallel connection by their hydraulic pipes. See FIG. 5, which for clarity includes 5 rams only. The operator will open a valve 11(T) to fill the incompressible pipe (11A) and the set of connected displacement rams (11(x)) and thereby achieve the desired operating height of the frame (5) by forcing a required amount of hydraulic fluid into the set of up to 40 paralleled extension cylinders (11(1)), (11(2)) being all the openers of the seeder. That lifts all the frames. Then valve (11(T)) is closed. Now pipe (11A) and the interiors of the rams (11) are a conjoined sealed space having a constant total volume holding an incompressible liquid. When any fertilizer knife, for example, is forced backwards by an obstacle causing that knife to lift, the pair of plates (7) will rotate about pivot point (8) and pin (9) of that opener will move forward reducing the length of the connected ram (11), pushing a volume of hydraulic fluid via pipe (11A) into the remaining rams, causing them to extend slightly and therefore frame (5) to rise slightly. This is a proportional but non-linear effect. Greater backward movement of any knife and a greater number of affected knives at the same time results in a larger upward movement of the frame (5) and greater reduction in the load on the affected knives. This action is referred to again—for overall changes in soil surface level—in Aspect #2.

Protection for the following seed tine, if the accompanying fertilizer tine is displaced by an obstacle, is provided in this Example as follows. A tab (45) is attached to either the top arm (81) or the bottom arm (82) of the seed tine parallelogram (80) located behind the fertilizer tine. A normally slack chain (9A) or rope, inextensible cord or equivalent thereof is attached by a shackle through a hole to tab (45) at one end and at the other to a shackle around multi-purpose pivot pin (9). The chain is normally slack so that the fertilizer and seed tines can work independently. But when the fertilizer knife/tine is forced backward by an obstacle and pivot point (9) is pushed forward, the chain is pulled taut, raising the seed tine immediately and reducing the chance of it also being damaged by the obstacle. The amount of slack can be varied when the opener is set up so that the threshold of the seed tine movement in response to movement in the fertilizer tine can thus be altered. In normal practice the seed tine would only be forced to move if the fertilizer tine experienced a large deflection upward.

Figure 3:
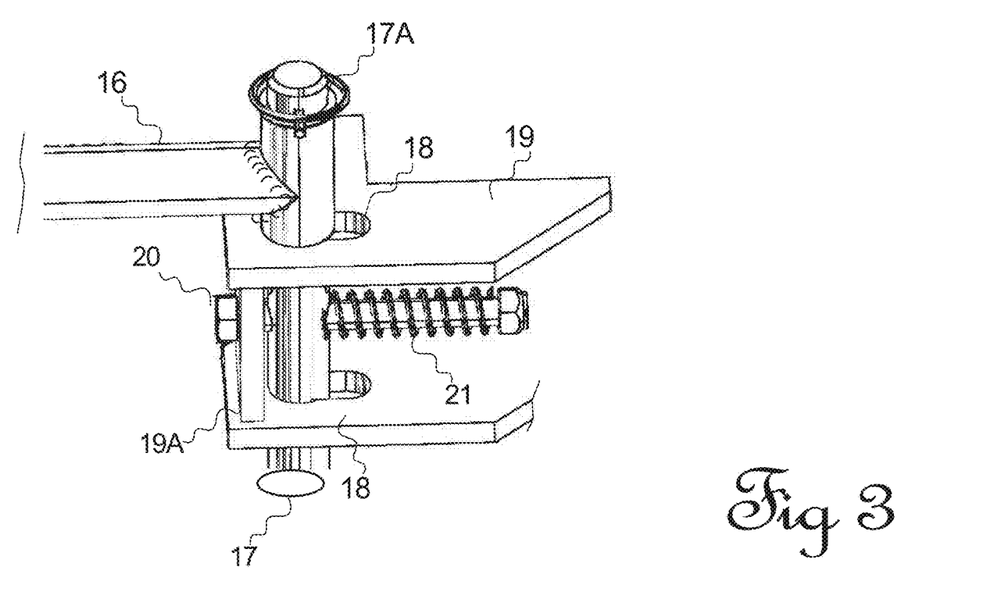
FIG. 3. Diagram showing the spring-loaded mount capable of providing sideway compliance for the supporting wheel (15), the press wheel (14), and the coulter wheel (22).

See FIG. 3. All three of the press wheel (14), the support wheel (15), and the coulter wheel (22) are mounted with spring-loaded means to provide an independent sideways compliance having a "breakout force" effect, but not independent vertical compliance, whenever an obstacle is an encountered or a swerve movement is imposed on the seeder. Each spring-loaded means tends to restore the wheel in a straight backward/forward line. FIG. 3 in relation to support wheel (15) illustrates the disposition. A trailing axle supported by a backwardly directed arm ((16) for wheel (15)) is pivotally mounted from a resiliently mounted, non-rotating support shaft (17); its axis parallel to the axis of the trailing axle. The forward end of the arm (16) is welded to a short rod or tube (17A) attached at right angles to the arm, which fits over shaft (17) and serves as the pivot which allows the supporting wheel (15) to move up and down in line with the machine. Shaft (17) is mounted through slotted apertures (18, 18) elongated in a leading/trailing direction in two plates (19) attached to the chassis (32) of the opener, allowing deviations to either side of perpendicular to the direction of motion. Each mount is drilled in the leading/trailing direction inside the mount (19A) and the hole is continued through shaft (17). Bolt (20) surrounded by coaxial compression spring (21) is passed through the hole. A retaining or locking nut such as one with a plastics core is tightened on to the spring to provide a desired straightening force against shaft (17). The hole through mount (19A) should be enlarged to allow side-to-side movement of bolt (20). The spring pushes the support shaft into alignment with the mount, at the left hand sides (as seen in FIG. 3) of holes (18) unless its force is overcome.

Similarly, the axle of the press wheel (14) is mounted on an arm (24) extending from and attached to tab (39). The arm is attached to the tab (39) with an over-length bolt and held tight against the tab by a selected compression spring (23) coaxial with the bolt. (See FIG. 6c). During a sideways force to the arm spring (23) will be further compressed. The wheel (14) is restored to the design alignment by action of the spring as soon as that large force is removed. Sideways compliance allows press wheel (14) to move sideways momentarily if it strikes an obstacle with sufficient force that it would otherwise be damaged.

The same principle of spring loading, slotted holes, and a breakout spring pressure is also used to maintain parallelogram (1) components in line yet provide sideways compliance, as previously described in this section.

Apart from potential damage arising from striking an unexpected obstacle, swerving the tractor pulling the seeder while the frames (5) are not raised—such as if the operator or a GPS steering mechanism fails to lift the machine early enough or lowers the machine too early when negotiating an end of field turn is likely to impose significant sideways forces on wheels. This is particularly relevant with the modern practice of using automatic GPS guided steering. After an end of field turn the GPS steering takes over from the operator and may aggressively steer the machine back to the correct A-B line.

As a result of providing sideways compliance at each opener and throughout the seeder, the seeder will track true, maintaining the accuracy required for the modern practice of seeding in between last season's rows. At the same time, sideways compliance reduces wear and damage. Vertical compliance includes improved obstacle avoidance and cooperation between openers assists with accurate seeding.

Typical, although non-limiting breakout force values for the opener are:

i) Fertilizer Tine 100 kg
 ii) Seed Tine 100 kg
 iii) Press Wheel 25 kg
 iv) Coulter 25 kg
 v) Support Wheel 25 kg Backward Breakout—This is set at the conventional level of 400 kg common to most machines.

Aspect #2:

The suspension means, including height regulation. According to the invention no supporting wheels are attached directly to the chassis (32) of the machine. Every opener incorporates a support wheel (15). The weight of each opener and a share of the seeder frame (112) is typically about 150 kg. That weight is supported, when the opener is lowered to the ground for use, partly by the support wheel and partly by the other working components. Seeders of this type are usually used on even ground. In case the soil surface is irregular and one or more supporting wheels moves upwards or downwards as required by surface variations the invention provides a mechanism to reduce the effect on the same opener and on other openers, so that all of the other openers cause the rigid frame (5) to make a compensating movement. This is achieved by the following arrangement.

Each support wheel of each separate opener is pivoted off the frame by trailing arm (16) as previously described. It is held in the vertical direction by a bar (30) (see FIG. 1) attached to the rear of arm (16) and at its top end to pivot point (9), to which the rear end of ram (11) is also attached. Bar (30) does not significantly restrict sideways compliance of wheel (15).

In Aspect #1 above the hydraulic interlinking mechanism was described in relation to any one wheel (15) meeting an obstacle. Aspect #2 refers to using the same apparatus in order to manage changes in level. The ram (11) is mounted at angle to the arms (2) and (36) of the parallelogram (1) of the opener so that if any one or more supporting wheels (15) moves upwards because of a rise in the surface then pivot point (9) will move forward and ram (11) on that wheel will shorten. As described in relation to FIG. 5, the extension side of the piston within each ram (11) is interconnected by plumbing in parallel to every ram (11) on every opener. The automatic control is proportional to the size of the movement of the affected wheels and to the number of affected wheels.

Given that the seeder according to the invention, including the interconnected ram system in which the frames and the openers are supported, when in use, by working components and individual wheels and in which the height of support of the frame at any time is determined by the volume of hydraulic oil in the interconnected ram system, it is useful to provide transverse stability across the machine. The diagram of FIG. 5a would not work unless each ram sharing pipe (11A) is mounted so that its pressure/displacement response is made non-linear.

Each ram (11) is mounted diagonally across the corresponding parallelogram (1) having an effect that as more oil is fed into the system and therefore raising the frame, the angle between ram (11) and its parallelogram (1) becomes more acute because the ram moves more in line with the parallelogram. As a result, the ram needs more hydraulic pressure to carry the weight of the frame. That effect keeps the machine stable and maintains the same average height of the frame (112) above the soil surface on both the right side and the left side of the seeder. It has a self-regulating attitude control.

If an external downwardly force was exerted such as by a person sitting on the right hand side of the frame (or by operating the seeder across sloped ground), the right side would lower a little and the left hand side would rise a little, since the total hydraulic fluid volume in pipes (11A) is a constant, while the pressure in pipes (11A) would rise as a result. Now that the right hand side of the frame is lower, the angle between the right hand rams (11) and corresponding parallelograms (1) is increased, enabling it to carry the extra weight. The left hand side of the frame is now slightly higher decreasing the angle between ram and parallelogram and so coming to rest in a state of equilibrium though with a slightly higher overall pressure in the system caused by the added weight. The progression of the altering angle (for this prototype machine, 5.5 degrees with frame fully up and 7 degrees as measured between ram (11) and arms (2) with the frame almost on the ground) determines the side to side stability performance of the machine. Thus the machine has stability across its width. The effect is as if the rams are made to behave like stiff compression springs.

One benefit of dynamic height regulation is to ensure that none of the ground-contacting components (coulter, supporting wheel, fertilizer tine, seed tine or press wheel) of any individual opener are exposed to forces exceeding their individual share of the weight.

The interconnected hydraulic ram plumbing (FIG. 5) allows another design improvement. The combined weight of the openers and the structure from which they are suspended is such that normally each supporting wheel (15) together with other equipment in contact with the ground carries a load of approximately 150 kg. If the machine passes over large surface undulations it is possible that one of more of the supporting wheels will come off the ground, when the forward spacer (3) between plates (2) reaches the mechanical stop (37).

If the number of wheels off the ground increases to for example 25% of the wheels off the ground, the remaining wheels each have a load in excess of 200 kg. At the same time, hydraulic fluid pressure inside (11A) increases and fluid will be automatically bled back to the tractor tank from the system via a pressure relief valve, lowering the entire seeder machine until that the total number of wheels (15) bearing weight on the ground increases and the load on each wheel becomes less than 200 kg. This prevents damage to all of the opener components and their respective bearings in rougher terrain. In an extreme case the hydraulic fluid will continue to be bled off and the frame will be lowered until the frame (5) itself is on the ground without exceeding the load on any one supporting wheel (15) and its associated opener components beyond a predetermined upper limit. The operator will become aware of that. When the terrain improves the operator can choose to re-inject hydraulic fluid volume into the plumbed-in-parallel rams (11) and raise the machine again.

Since the weight of all of the openers and the associated frames of an air seeder is shared by the array of support wheels (15) and other components upon or within the soil when in a working configuration and lowered, the openers can closely follow the ground contours when the chassis of the seeder, which preferably has a tow eye allowing both horizontal and vertical pivoting so that the chassis, bearing the frames and the openers may trail behind the tractor while remaining laterally centered in relation to an axis of symmetry of the entire air seeder, coincident with a beam connecting a tractor linkage to a following trailer and hopper.

Seeder operation while traversing a curved path when in the working configuration and lowered is discussed. For example, making detours around obstacles such as trees or water fixtures require turns. This also applies when the operator is late in raising the openers during an end of field turn and/or lowers them early after such a turn. The sideways movement required of any one of the openers increases toward the side of the machine on the inside of the turn, and some seeders may exceed their breakout force limits. The openers on the inside make the tightest turn. An advantage of this invention is that the sideways compliance provided to the openers and parts thereof will reduce sideways forces on the working components of each opener during a turn. The machine will also require less tractor power since each opener is following a low-resistance path. The machine, as described elsewhere, is provided with an additional overall sideways compliance mechanism—if the total sideways load reaches 2000 kg, then all plates (112) and the openers are temporarily allowed to move sideways in response to such a force but will return to the path directly behind the tractor as soon as that force is reduced. This mechanism is described in a co-pending patent application (see "Cross-reference"). Striking an obstacle like a stone while carrying out a turn markedly compounds the problem. And in case of disc seeders the force required to "drag" it sideways during a turn must be taken by the disc bearings, making sideways compliance even more important.

This seeder uses only the small diameter individual opener support wheels (15). There are no support wheels directly attached to the frame. This means that the two rows (a leading bank of 20 and a trailing bank of 20) openers can be very close together in a fore and aft direction and therefore close together on the circumference of the turn, thus minimising the sideways forces. Since the openers according to this invention are capable of individually and separately moving sideways by a limited amount if subjected to sideways forces without damage as described in Aspect #1 above, this invention is better able to withstand the forces that occur during a turn or curved path while carrying out seeding.

The machine we describe has a total of 40 small support wheels (15) each attached to a corresponding opener that collectively support the working frame. Each wheel typically supports 150 kg although the weight is reduced when components of the opener, including for example those components that ride on or penetrate the soil are engaged with the soil. An advantage is that the compaction will be much lower than for prior-art seeders where the working frame is carried by fewer wheels each carrying a heavier load. The operator may choose to increase or decrease the proportion of weight borne by the wheels, by adding to the volume of hydraulic fluid into the common pipe (11A) (see FIG. 5) connected to all the rams (11) thereby raising the rigid frame (5) or letting hydraulic fluid out, respectively.

Aspect #3:

Adjustments to the openers, to vary seed placement within the soil. See FIG. 2 in particular.

1. Press wheel (14) height adjustment. A tab (27) is attached to the rear of the seed tine (80A) above tab (39) and a pin (28) is set in this tab (27). A flat bar (25) is bolted by a single bolt at its lower end to arm (24), which spaces the press wheel back from the seed tine (80A). A spring ((26)—not shown) concentric with this bolt holds the bar (25) against the arm (24). The upper end of bar (25) has a number of holes (29). Any one hole may be selected, to set the height of the press wheel. Pulling bar (25) to one side (compressing spring (26) in the process and placing one of the holes (29) over the pin (28) preserves the setting. The spring (26) holds bar (25) in place once it is "pinned". No tools are required for this adjustment. Adjusting the height of the press wheel adjusts the depth of each seed tine (80A) in any one opener.

2. Separate press wheel (14) pressure (weight) adjustment. A bolt (44) is fixed between the two plates which make up assembly (5) at the bottom rear corner. A notched bracket (41) is fixed to the top of seed tine (80A). A tension spring (42) is attached at its bottom end to bolt (44) and at its top end to a short length of chain (43). A selected link in the chain (43) is fitted into the notched bracket (41). The weight on the press wheel/seed tine combination can be adjusted by the choice of link in the chain (43). No tools are required for this adjustment, either.

3. Support wheel (15) height adjustment. Adjusting the height of the supporting wheel affects the depth of the fertilizer knife in this machine. The pin, previously described in this section as pivot point (9) is set in plates (7) fixed to the fertilizer tine. A bracket (38) is fixed to the rear end of arm (16) and a pin (48) is fixed to the bracket. A bar (30) including a row of spaced holes at its upper end and two more closely spaced holes at its lower end provides the height adjustment for supporting wheel (15). The bar can be attached at its upper end by slipping any one of the holes provided over the pin at pivot point (9) and at its lower end by placing either of the two holes over the pin (48) and securing it with a linch pin. No tools are required for these adjustments.

4. Coulter wheel (22) adjustment. See FIG. 2. A pin (31) is fixed to the rear of the arm (32) (chassis) behind the axle of the coulter. A pin (33C) extends from pivot point (34) on plate 5. A bar (35) has multiple holes at its upper end and two holes at its lower end. The height of the coulter is adjusted by choosing which of the range of holes in the upper end to slip over pin (33C) and which of the holes in the lower end to slip over pin (31). The bar is secured on pins (31) and (33) using a linch pin. The machine as designed offers a much more positive and accurate coulter depth adjustment than existing machines. No tools are required for this adjustment.

5. Break-out force adjustment. As seen in FIG. 1, any of two rows of holes through plate (112) are selected to mount the pivot point for the forward end of ram (11). Choosing holes that increase the angle of ram (11) relative to the momentary attitude of the parallelogram will reduce the hydraulic fluid pressure in the pipe (11A) connecting rams (11) in adjacent openers. The reduced hydraulic fluid pressure lowers the sideways force required to cause the opener at the level of parallelogram (1) to "break-out" i.e. move plates (2) within the slotted holes (6) as described in Aspect #1. Similarly, the reduced hydraulic fluid pressure will lower the backward "break out" force for the fertilizer tine.

6. The fertilizer tine angle can be adjusted by choosing a different hole for stop (10). (The range of holes is not shown in FIGS. 1 and 2.) A steeper fertilizer tine angle is selected when the desired result is a narrow knife entry with more fine soil produced at the knife entry, although this option will require more tractor horsepower. A shallower fertilizer tine angle is likely to produce larger clods of soil (and less fine material). The depth of the fertilizer tine is adjusted by adjusting the supporting wheel (15) as previously described in this section. The depth can also be adjusted as follows: The assembly (5) is provided with two holes for pivot point (8) about either of which the plate (7) and the fertilizer tine will pivot. Moving to the lower hole will also lower the fertilizer tine, in relation to the supporting wheel (15). Furthermore, fine adjustment to the depth of the fertilizer tine/knife in relation to the support wheel can be made by adjusting the length of the top link (36). Some adjustments for the seed tine and closer are covered under Aspect #5.

Figures 6A, 6B, 6C:
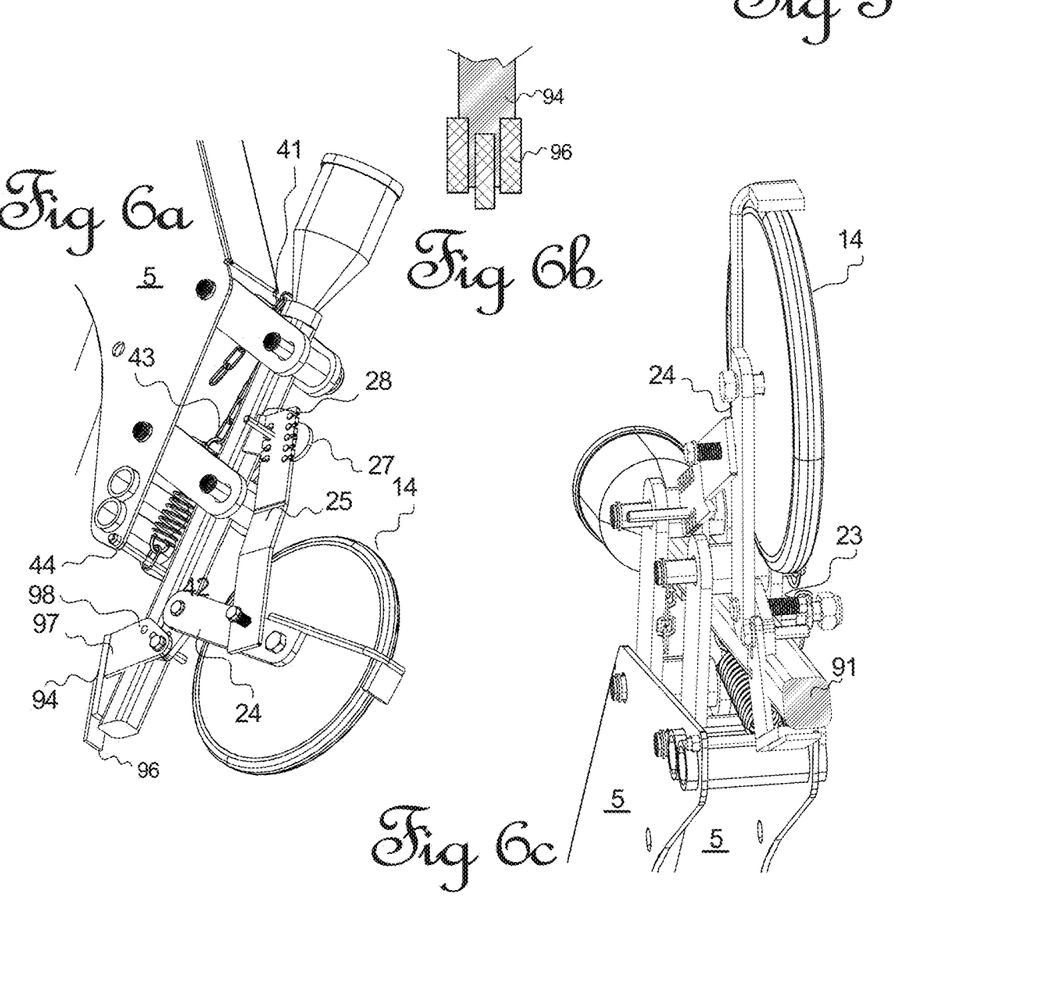

7. The press wheel scraper clearance can be adjusted. A scraper system for the press wheel (14), to maintain the wheel clean as shown in FIG. 6a and FIG. 6c, comprises a 10 mm mild steel rod (60) welded to the top edge of press wheel axle support bar 24 and extends rearwards past the edge of the press wheel. Just past the rear edge of the press wheel, the rod (60) is bent at right angles so that it is parallel to axle of the press wheel and almost touching the rubber surface of the press wheel tyre. A square (50 mm×50 mm×12 mm) piece of mild steel (61) is welded by its upper edge to this end piece of the rod (60) so that (61) is almost touching the press wheel tyre. A 12 mm×50 mm×5 mm wear strip of tungsten or tungsten carbide or the like (62) which acts as the scraper is soldered or otherwise securely attached to the lower edge of the mild steel square (61). The scraper can be moved closer to the tyre (because of wear of the tyre or the tungsten wear strip) simply by bending rod (60) downwards. The geometry of the set up shown in FIG. 6a provides that as the rod (60) moves down, the square (b) and the wear strip (c) move closer to the tyre. This bending down can be simply done with a hammer.

Aspect #4:

Disc Seeder Conversion. The openers are reversibly converted to a disc seeder mode as follows.

1. The fertilizer knife (85) is detached from its "knock-on" fitting on the fertilizer tine (86).
    a. The fertilizer tine (86) is then drawn backwards (by hand) and secured in a held back position behind a pin inserted at point (87) on assembly (5).
2. A knock-on fitting is welded to a standard "off-the shelf" disc seeder assembly.
3. The knock-on fitting can be attached to the fertilizer tine (86) previously occupied by the fertilizer knife. It can be secured there by a pin though hole (90).
4. In an alternative conversion, a disc seeder assembly is bolted to the fertilizer tine (after removing the fertilizer knife).

It should be noted that drawing back the fertilizer tine (86) causes the seed tine to be raised out of its working position by the chain (9A) fixed to tab (45) as previously described in relation to Aspect #1. If the operator wants to use the seed tine in conjunction with the disc (perhaps when planting canola), the chain can be disconnected. The inventor suggests to alter the angle of the ram (11) to a steeper angle relative to the parallelogram, as described in Aspect #3, to lower the sideways "break-out" force because the bearings on any disc assembly are less robust than the one-piece fertilizer tine.

It is important to note that while the weight of the opener (and its share of weight of the frame and chassis) can be used to press and hold the discs in the ground, no one disc will experience a load greater than the weight of the opener to which it is attached, plus its share of the frame (112) and support beams weight. As a result, the discs will always be cutting (and seeding) at the set depth unless forced upwards by an obstacle exerting an effective force greater than the weight of the opener to which it is attached, plus its share of the frame and seeder chassis weight.

As an option, the coulter wheel can be removed and the support wheel can be moved sideways to the coulter wheel position (in line with the discs). Then, the support wheel can partially smooth the ground prior to the disc (or discs) cutting it, which is useful in some planting conditions.

Aspect #5

Use of Hard-surfaced Tiles on the Closer Plate. A tab (39) is attached to a trailing side of box-section seed tine (91) near the bottom, as a mount for a closer plate (94) that is intended to and protrude below the end of, and on the leading side of, the seed tine. Several holes (93) are drilled in tab (39), which may also be used as a base for strip (24) that supports the closer or press wheel (14). Tab (97) includes a number of holes (obscured in the Figs) arranged in a vertical row relative to the operating orientation of the closer plate (94). The closer plate (94) is mounted on seed tine (91) by fastening a bolt through a selected one of the tab holes (98) in (97) and one of the holes (93) in tab (39).

The closer plate consists of a metal plate (94), a side attachment plate (97) welded along one side as an "L" shape, and a number of hard-wearing tiles (96) attached to the leading surface (94). The tiles may be comprised of tungsten or a hard tungsten alloy, or tungsten carbide, or a hard metal such as "Stellite®" which can be applied by an arc welding rod.

By selecting the appropriate hole (98) in tab (97) the operator can choose the angle that the closer plate (94) presents to the soil. When in use, the drag force on the closer plate (94) holds it firmly against tine (91). Also, by choosing the appropriate hole (93) in the tab (39) the operator can alter the depth of operation of closer plate (94). This is important so that the closer plate (94) can be lowered progressively as the tungsten plates become worn. The preferred arrangement of tiles (96) on closer plate (94) is the arrangement shown in FIG. 6b. The centre third extends deeper than the outside thirds as shown in FIG. 6b. The plate itself may extend below the centre tile to provide support since hard materials are often brittle.

Note that the seed tine (91) is aligned so that in normal use the hollow centre of the typically box-section tube has a trailing slope toward the downward end, so that seeds separated out by the cyclone at the top of the tine flow along the leading side of the tine and are fed into the soil. FIGS. 1 and 2 assume that the apparatus is not engaged with the soil. Engagement would shift some parts.

When in use, the centre third of the closer plate (94) will make a deeper "trench" than the edges. Seed tine (91) slopes forward at the top, relative to the bottom of the tine. The seeds that slide down the forward inside surface of seed tine (91) are travelling forward at the speed of the seeding machine itself and will fall accurately into the deeper trench made by the centre third of the closer plate (94), while the shorter side tiles allow fine soil to travel around the protruding centre third and settle around and on top of the seed. The inventor believes that this closer plate and process will provide good seed to soil contact once the press wheel has compacted the fine soil. Larger clods of soil if present are likely to stay in front of closer plate (94) until sufficiently broken into smaller fine soil or are ejected from the trench. The use of three thirds is merely one option. In other versions the closer plate could be divided differently e.g. 20% on each side with the centre 60% extending deeper.

The accuracy of this seed placement allows a 50 mm wide press wheel to be used in conjunction with the 50 mm wide closer plate to optimum efficiency in compacting 'fines' around the seed optimising seed/soil contact.

Results and Advantages

A seeder including this aspect of the invention is thereby capable of averaging out the height of a surface undulation. This can be seen in the Youtube video identified above. For example; if the leading row of openers had gone into a 100 mm cross-field depressed undulation, then the front row of openers will become lower by 50 mm relative to the frame (112) the trailing row of openers will rise by 50 mm (relative to the frame (112). The leading-row rams had become extended and since the hydraulic fluid volume in all the rams (11) is constant then hydraulic fluid will flow from the trailing-row rams (11) to the leading-row rams (11). As an immediate result, the rams in the trailing row are retracted, raising the corresponding openers relative to the frame thereby tending to ensure that all openers are taking an equal share of the weight of the frame (112).

This invention has an effect of providing what used to be a rigid array of openers and parts with an ability to go over or around obstacles, and to cope with undulations, while maintaining predetermined seeder settings. Accordingly, the parts that come into contact with or engage the soil are provided with resilient or biased supports that allow sideways movement and vertical movement.

Use of the shared local control system "hard-plumbed" into the rams (11) allows each opener to deal directly and immediately with undulations while applying the designed force on the working components of that opener. It will raise and lower the frame (112) in response to the feedback from collective hydraulic rams (11). When in use, the frames seem to float above the ground following the average contour of the ground below it. It cannot dig in to the ground at one end or float too high above the ground at the other end because the feedback system will adjust the height of the frame to prevent it.

The skilled reader will appreciate that the described ways to provide the working parts, including fertilizer and seed tines and the wheels with sideways compliance will substantially reduce wear on seeder parts, and reduce tractor horsepower, and will increase the probability of optimised planting.

A seed tine/closer combination according to this invention can be adjusted as it wears so that the need to replace the closer plate parts is very significantly reduced (by orders of magnitude).

The seeder—as a delivery mechanism—is very robust. The closer design with its mounting flexibility ensures optimum production of "fines", closure of the fertilizer trench, accuracy of seed placement and reliable coverage of the seed with soil by the press wheel.

Finally it will be understood that the scope of this invention as described and/or illustrated herein is not limited to the specified embodiments. Those of skill will appreciate that various modifications, additions, known equivalents, and substitutions are possible without departing from the scope and spirit of the invention as set forth in the following claims.

I claim:

1. An opener for an agricultural machine that is a seeder and including at least one array including a plurality of the openers attached side by side to at least one rigid horizontally disposed chassis aligned in an orientation transversely across a direction of motion when towed, when in use, over a soil surface by a tractor, the opener comprising:
   a rigid frame comprised of a shaped plate bent into a deep 'U' configuration; and
   a leading parallelogram suspension in a vertically oriented plane and in a position trailing the chassis, the leading parallelogram suspension holding the rigid frame, the leading parallelogram suspension including
      a leading frame having a height and attached at a lower end to the chassis,
      a turnbuckle arm connecting an upper end of the leading frame to an upper part of the rigid frame by an articulated joint at each end of the turnbuckle arm, and
      a horizontally spaced-apart pair of long plates pivotally connected by a first pivot pin at a first end of the long plates to a lower part of the leading frame and at a second end of the long plates by a second pivot pin to a lower part of the rigid frame, the first pivot pin being held through at least one slotted aperture in the leading frame,
      said leading parallelogram suspension thereby providing the rigid frame with a capacity for sideways movement or sideways compliance,
   wherein a first restoring force for overcoming the sideways movement or sideways compliance is provided by a compression spring mounted in compression between the chassis and a connecting plate attached along the pair of long plates, the rigid frame being supported above the soil surface by a support wheel.

2. The opener for the agricultural machine as claimed in claim 1, wherein the leading parallelogram suspension is bridged by a diagonally mounted hydraulic ram pivotally connected at a first end to a middle part of the leading frame and pivotally connected at a second end to an upper end of a downwardly directed fertilizer tine, the fertilizer tine bearing, at a lower end, a fertilizer knife engaging with the soil surface, the fertilizer tine being pivotally mounted by a pivot traversing the rigid frame mounted from the rigid frame, said upper end of the fertilizer tine being held backward, when in use, against a stop within the rigid frame by a second restoring force developed by the ram for overcoming the sideways movement or sideways compliance of the rigid frame, and a force maintaining the position of the fertilizer tine unless a breakout force applied to the fertilizer knife when the agricultural machine is in use overcomes the second restoring force provided by the hydraulic ram and raises the pressure of a hydraulic fluid inside the hydraulic ram.

3. The opener for the agricultural machine as claimed in claim 2, wherein the rigid frame is substantially supported from the soil surface by the support wheel maintained in vertical position by an upwardly directed support wheel bar connected to the rigid frame at the upper end of the downwardly directed fertilizer tine and maintained in a trailing position behind the chassis by a first forwardly directed arm connected with a third pivot pin passing through another slotted aperture within each of another pair of plates attached to the chassis, the rigid frame being additionally supported by a coulter wheel maintained in position by an upwardly directed coulter wheel bar connected to the rigid frame at the second pivot pin at the second end of the pair of long plates, the rigid frame being maintained in a trailing position behind the chassis by a second forwardly directed arm connected with the third pivot pin.

4. The opener for the agricultural machine as claimed in claim 3, wherein the support wheel and the coulter wheel are configured to swing from side to side to an extent limited by the two slotted apertures holding the third pivot pin receiving the first and second forwardly directed arms from each wheel, thereby providing sideways compliance for the support wheel and for the coulter wheel, while a restoring force for the sideways compliance of the support wheel and the coulter wheel is provided when in use by the compression spring tending to force the third pivot pin to an end of the two slotted apertures.

5. The opener for the agricultural machine as claimed in claim 3, wherein a rear aspect of the rigid frame supports an assembly comprising a seed tine and a press wheel upon a pivotally mounted trailing parallelogram suspension comprised of an upper arm and a lower arm parallel to each other, both of the upper arm and the lower arm being pivotally attached to the rigid frame at a leading end and both of the upper arm and the lower arm being attached to the assembly at a trailing end thereby providing vertical compliance, and a tension spring connected across the trailing parallelogram suspension that is configured, when in use, to control a pressure exerted by the press wheel upon the soil surface, the press wheel having a spring mounted support providing sideways compliance relative to the rigid frame, the assembly being further provided with a chain connected at a first end to the upper end of the downwardly directed fertilizer tine, passing over the rigid frame, and connected by a coupling onto the trailing end of the lower arm so that, when in use, forward motion of the upper end of the fertilizer tine in the event of a collision between the fertilizer tine and an object on or in the soil surface pulls on the chain and causes deflection of the trailing parallelogram suspension, lifting the seed tine.

6. The opener for the agricultural machine as claimed in claim 5, wherein a threshold for lifting the seed tine in advance of the collision is predetermined by adjusting an amount of slack in the chain.

7. The opener for the agricultural machine as claimed in claim 5, wherein the trailing parallelogram assembly includes a closer plate mounted to precede the seed tine, the closer plate bearing upon a leading face an array of tiles of a hard material selected from tungsten, tungsten alloys, tungsten carbide, and chromium alloys.

8. The opener for the agricultural machine as claimed in claim 2, wherein the hydraulic ram diagonally mounted across the leading parallelogram suspension is plumbed to at least one other hydraulic ram within at least one adjacent opener using a shared pipeline sharing a common volume of hydraulic fluid and closed at a control valve whereby, when in use, the hydraulic rams share a common hydraulic pressure at a fixed volume and a compression experienced by any one hydraulic ram is coupled to the at least one other hydraulic ram in order that instantaneous conditions including a change in relative height of the soil surface and impact of the fertilizer tine of any one opener with objects on or in the soil surface are, when in use, communicated to said at least one adjacent opener, causing the leading parallelogram suspension of each opener to alter the height of the rigid frame.

9. The opener for the agricultural machine as claimed in claim 8, wherein the control valve is configured, when in use, to admit pumped hydraulic fluid into the shared pipeline from a tank or from the shared pipeline into the tank under control of an operator, thereby providing the operator with an immediate ability to alter a mean height for the openers that share the pipeline.

10. The opener for the agricultural machine as claimed in claim 9, wherein the shared pipeline includes an overpressure control valve connected to the tank.

11. The opener for the agricultural machine as claimed in claim 1, wherein a diagonal placement of each hydraulic ram across the corresponding leading parallelogram suspension provides, when in use, a non-linear relationship between pressure and extension, wherein a greater hydraulic pressure within the hydraulic ram results in a proportionally smaller amount of lift of the rigid frame, thereby providing a side-to-side stability in height for the openers having hydraulic rams interconnected by the shared pipeline.

12. The opener for the agricultural machine as claimed in claim 7, wherein the hydraulic ram of at least one of a leading bank of openers on an agricultural machine having more than one rigid horizontally disposed chassis is connected by a shared pipeline with at least one hydraulic ram in a trailing bank of openers, thereby providing the trailing bank of openers with a capability to respond in anticipation of undulations on the soil surface thereby tending to maintain a predetermined depth of implantation of seeds and fertilizers.

13. The opener for the agricultural machine as claimed in claim 1, wherein a configuration of the opener in relation to working conditions is adjustable by one or more of:

providing a range of holes comprising available pivot points within a bar pivotally connected to an axle of a press wheel in order that selection of one pivot point, when in use, varies a height of the press wheel and the depth of a seed tine, providing a tension spring terminated with a short chain pivotally mounted from a first end attached to the rigid frame, passing diagonally across a pivotally mounted trailing parallelogram suspension and held within a notched bracket mounted near the top of the seed tine, in order to permit any selected link of the chain to be held in the bracket, thereby when in use varying the tension across the trailing parallelogram suspension having an effect of varying a weight applied by the press wheel onto the soil surface, providing a range of holes within an upwardly directed support wheel bar, each of the holes within the upwardly directed support wheel bar being configured to accept an additional pivot pin thereby setting an amount of extension of the upwardly directed support wheel bar maintaining the rigid frame above the support wheel in order to, when in use, select a height of the rigid frame above the soil surface, providing a range of holes within an upwardly directed coulter wheel bar, each of the holes within the upwardly directed coulter wheel bar being configured to accept a pin thereby setting an amount of extension of the upwardly directed coulter wheel bar in order to, when in use, select a height of the rigid frame above the coulter wheel, providing the turnbuckle within the leading parallelogram suspension thereby providing a capability for varying a tilt in the rigid frame in order to set, when in use, an angle of attack of a fertilizer tine, providing a range of holes comprising available pivot points within the leading frame allowing for selection of the position of a pivotal mount at the first end of the hydraulic ram in order to vary, when in use, a break-out force for sideways movement, and providing a range of adjacent holes within the rigid frame each configured to accept a stop pin passing across the rigid frame comprising the stop for the upper end of the fertilizer tine in order to set, when in use, an angle of attack of the fertilizer tine.

* * * * *